Patented Mar. 31, 1925.

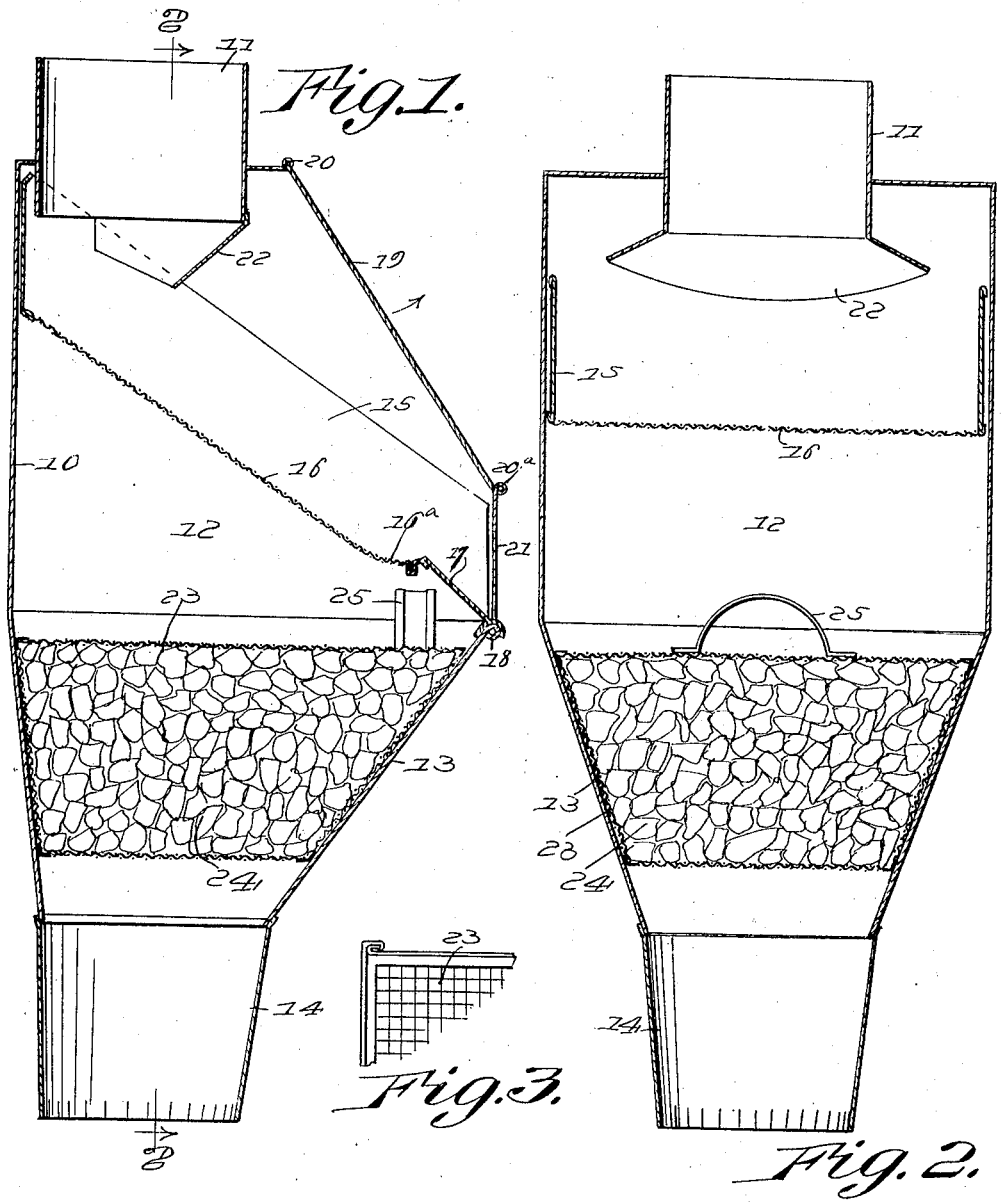

1,532,013

UNITED STATES PATENT OFFICE.

JOHN B. WINANS, OF WINCHESTER, KENTUCKY.

WATER FILTER.

Application filed October 27, 1921. Serial No. 510,684.

*To all whom it may concern:*

Be it known that JOHN B. WINANS, a citizen of the United States of America, residing at Winchester, in the county of Clark and State of Kentucky, has invented new and useful Improvements in Water Filters, of which the following is a specification.

The object of the invention is to provide a simple and efficient rain water filter for cisterns and adapted to be arranged to receive water from a downspout, the particular object in view is to provide a filtering apparatus for this purpose which is practically selfcleaning and which is adapted to eliminate foreign matter from the water so as to only deposit pure and sanitary water in the cistern; and with this object in view the invention consists in a construction and combination of parts of which a preferred embodiment is shown in the accompanying drawings, wherein:—

Figure 1 is a vertical sectional view of a filter embodying the invention.

Figure 2 is a vertical section taken on the plane indicated by the line 2—2 of Figure 1.

Figure 3 is a detail plan view of a portion of the filtering web.

The apparatus consists essentially of a casing 10 provided at its upper end with a collar 11 for attachment to or communication with a downspout from which the water to be filtered is to be received, said casing having a main compartment 12 beneath which is arranged a tapered seat 13 of funnel shape terminating in an outlet spout 14 whereby the filtered water may be conveyed through any suitable medium to the cistern.

Located in an inclined position in the main compartment of the casing above the seat 13 is a screen 15 having side and upper walls and a web 16 of fine brass gauze or screen which is disposed at an inclination downward to a lip 17 which extends over a rolled bead 18 at the upper edge of the funnel shaped portion or seat 13.

The front of the compartment 12 is fitted with a lid 19 hinged at its upper edge as shown at 20 to the casing and having a depending leaf 21 hinged at its free edge as at 20ª and designed to rest upon the upper surface of the lip 17, and obviously by raising the lid access is given to the interior of the screen to remove any accumulations of leaves or trash therefrom.

At the lower end of the inlet collar 11 there is attached a rearwardly directed deflector 22 embracing the collar for the greater part of its circumference designed to cause the water as it enters the filter to be thrown against the upper portion of the webbing of the screen so that it may flow downwardly throughout the entire surface of the screen and serve to urge leaves or other objects caught by the screen toward the lower edge thereof to the end that the webbing may not be obstructed and thus prevent it from affording a passage therethrough of the water.

Aligned within the seat formed by the funnel shaped lower portion of the casing is a basket 23 composed of screen wire or its equivalent and containing a filler 24 of filtering material such as charcoal or its equivalent. This basket is adapted to be removed from time to time for replenishment or cleansing and to this end is provided with a suitable handle 25.

The water introduced through the collar 11 and deposited in the screen, after passing through the web of the latter falls upon the filtering basket and must find its way through the filtering and purifying filler before being deposited in the cistern, and therefore any fine particles of foreign matter which may not be eliminated by the web of the screen are caught by the filler and retained subject to removal by any suitable cleansing procedure.

The screen 15 obviously is also removable for cleansing purposes from the casing and the lower edge portion of the web 16 is preferably deflected slightly from the plane of the body portion thereof as shown at 16ª, just inside of its attachment to the lip 17 so as to have the effect of retarding the flow of water at that point and minimizing the tendency of the water to flow from the surface instead of passing through the filtering medium.

Having described the invention, what is claimed as new and useful is:—

A filter having a casing provided with a main compartment having an inlet collar, a downwardly tapered funnel-shaped seat beneath the main compartment, an outlet spout communicating with said seat, a flat screen disposed obliquely in the main compartment in intercepting relation with a column of water passing therethrough, a filtering basket having a filter of water located in said seat, a lip disposed at the same inclination as the screen and extending at its lower edge over a rolled bead at the upper edge of the funnel-shaped seat, the lower edge of the screen being deflected slightly from the plane of the body portion thereof and connected with the lip adjacent the deflected portion to effect retarding of the flow of water at that point, and a cleanout door hingedly mounted on the front of the casing and having its free edge bearing on the upper surface of said lip.

In testimony whereof he affixes his signature.

JOHN B. WINANS.